Sept. 29, 1931. C. WALD 1,825,609
AIRPLANE CONTROL
Filed Nov. 26, 1929 4 Sheets-Sheet 1
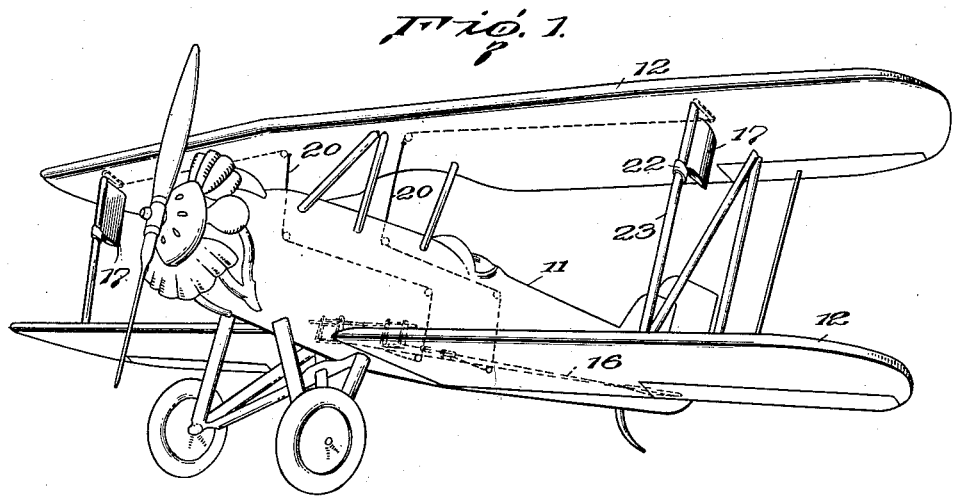
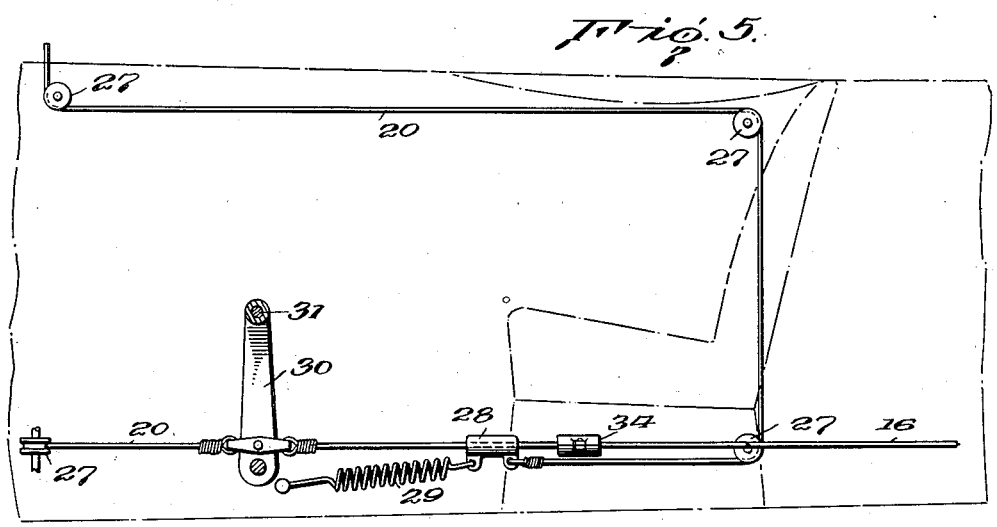
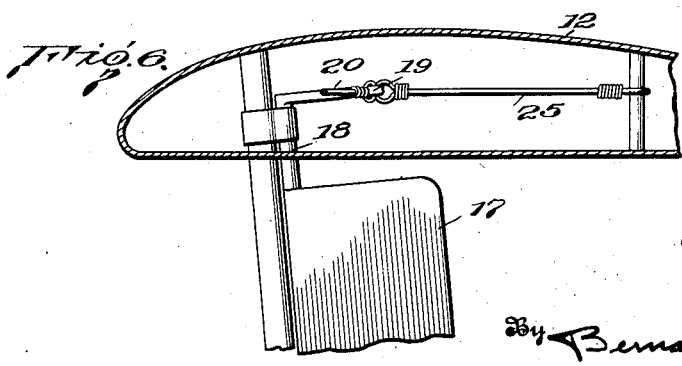
Inventor
Charles Wald,
By Bernard F. Garvey
Attorney

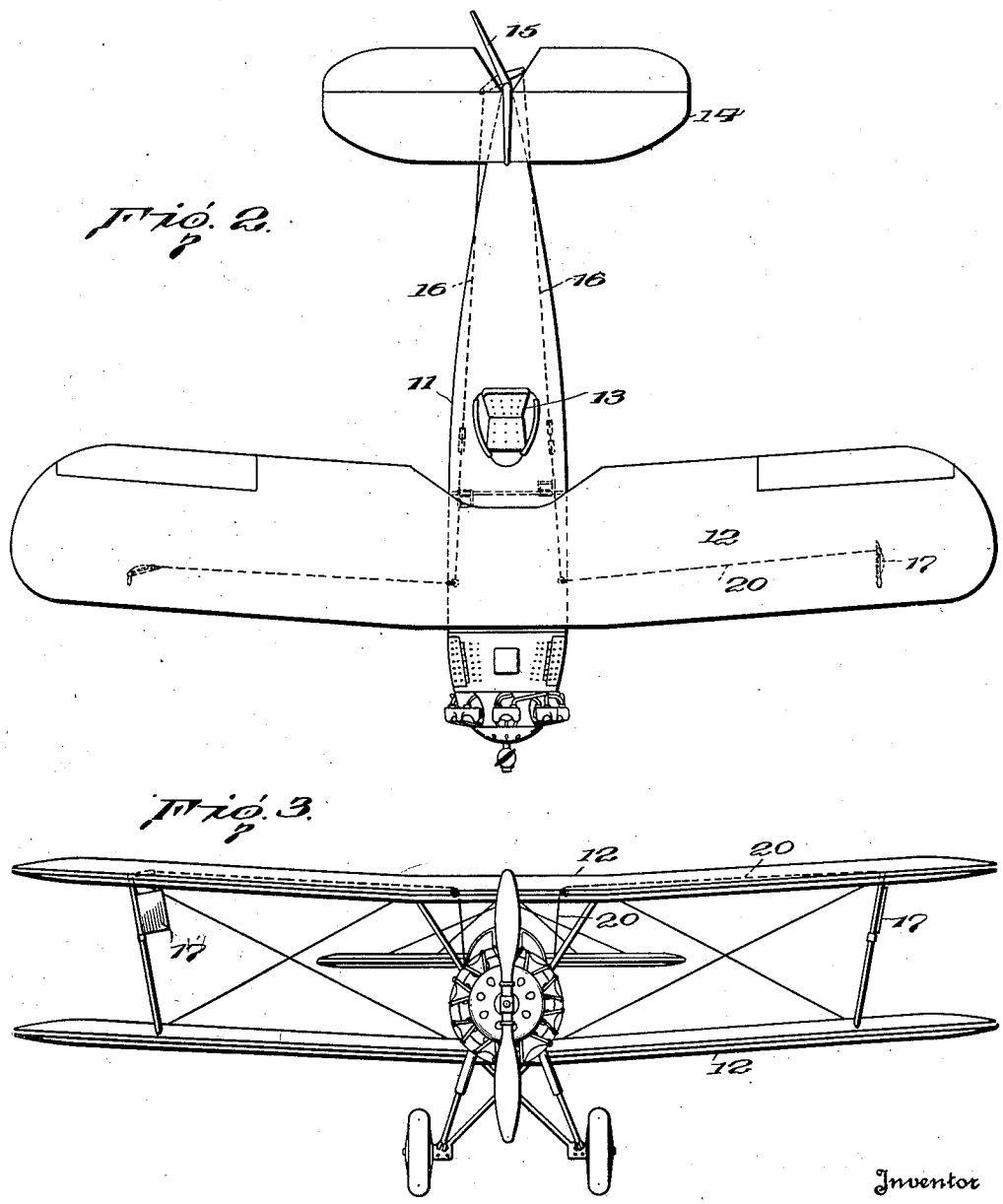

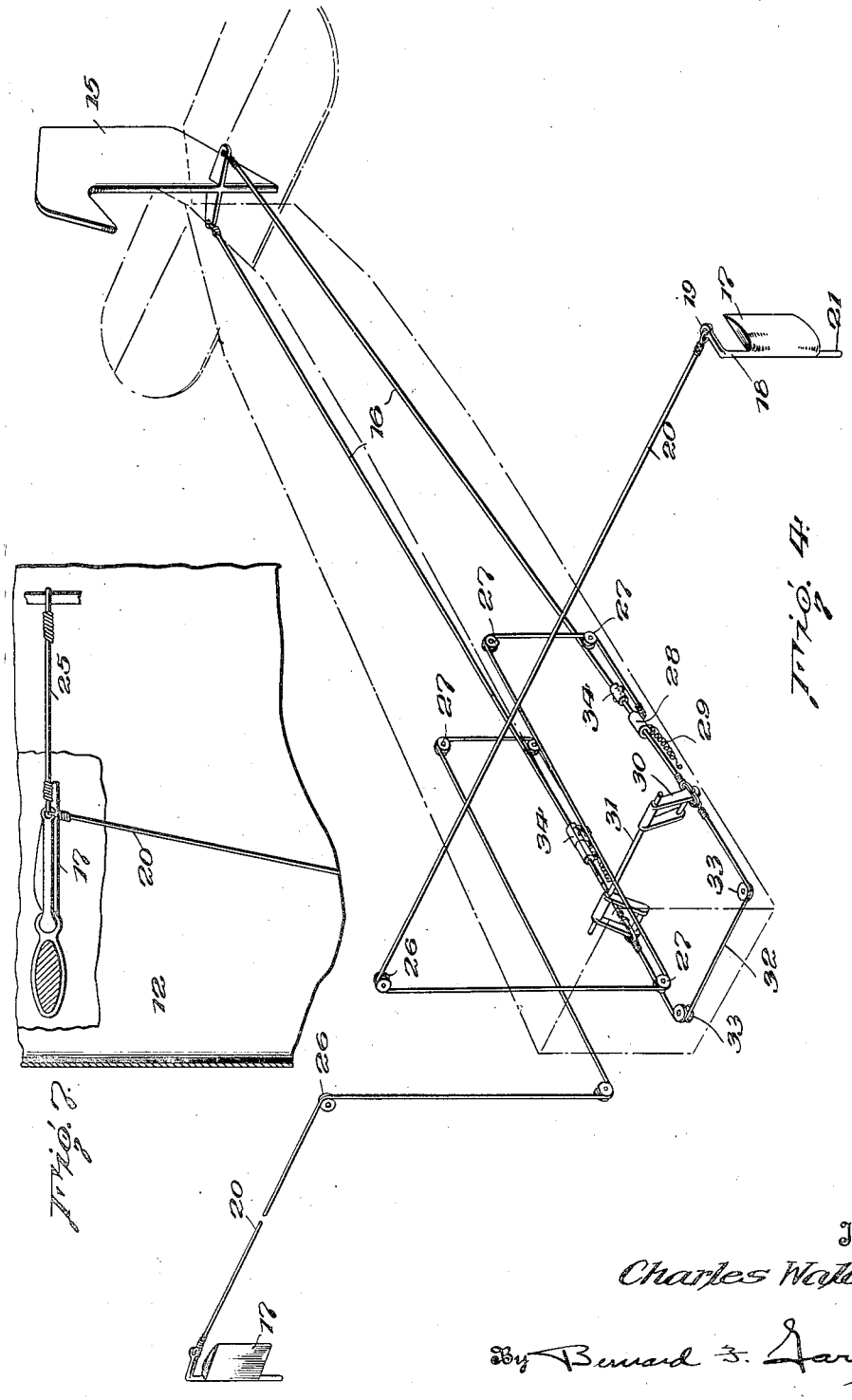

Sept. 29, 1931.  C. WALD  1,825,609
AIRPLANE CONTROL
Filed Nov. 26, 1929   4 Sheets-Sheet 4
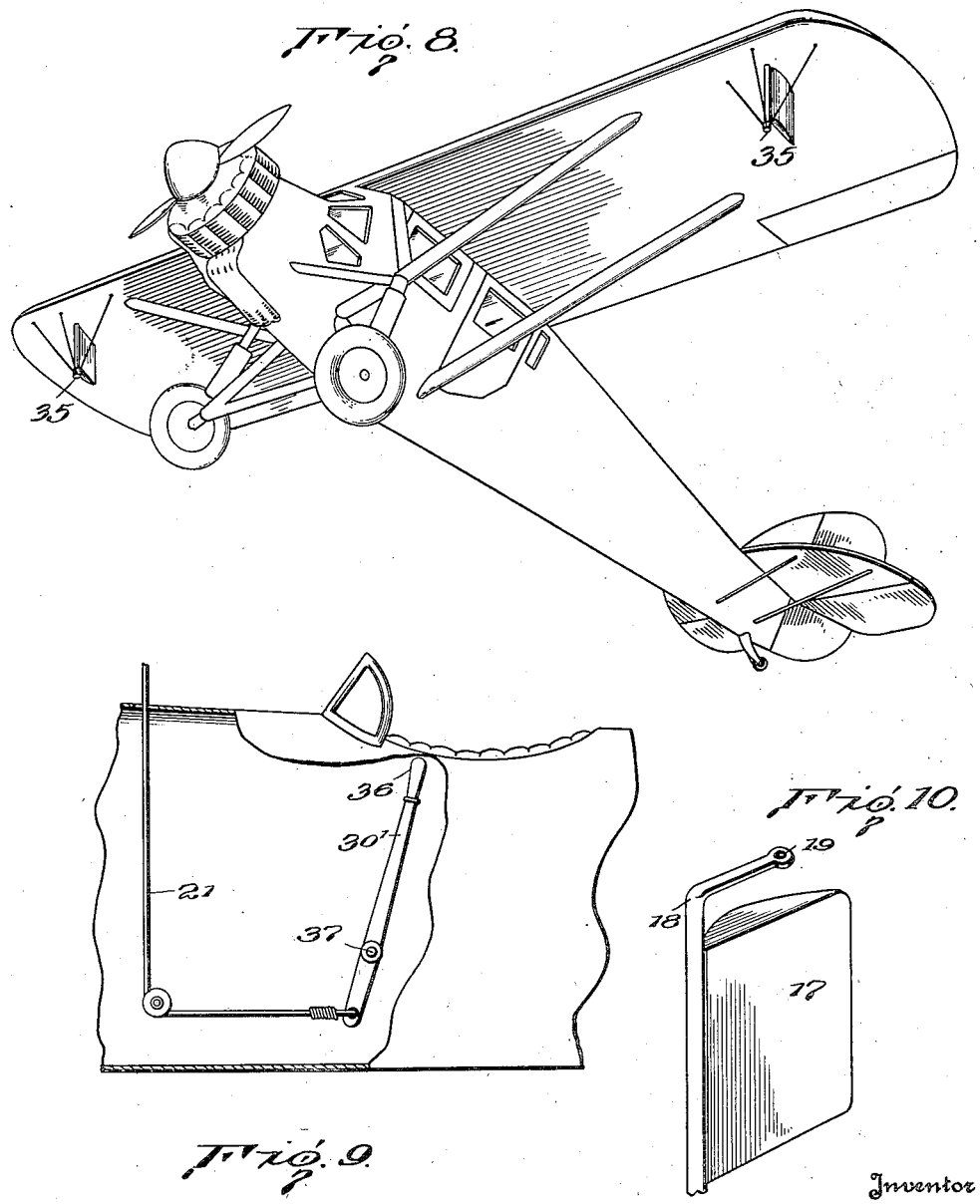

Patented Sept. 29, 1931

1,825,609

UNITED STATES PATENT OFFICE

CHARLES WALD, OF FREEPORT, NEW YORK

AIRPLANE CONTROL

Application filed November 26, 1929. Serial No. 409,870.

The present invention consists of an airplane control, which is designed for use on modern airplanes, giving the airplane pilot an effective control to recover at will from spinning. The device is designed to regain control equally from the ordinary spin, the flat spin and the power spin. Spinning in all its forms invariably is caused by stalling the airplane with or without engine power, that is, by reducing the forward flight of the airplane to its stalling speed, at which rate of speed, the dynamic reaction of air pressure is insufficient to sustain the airplane in flight.

When an airplane goes into a spin, either voluntarily or involuntarily, it is necessary, with present-day controls, to rely principally upon the vertical rudder of the tail unit to regain control of the airplane, and as is well-known, this is of no avail because of the attitude of the airplane in its helical or spiral fall. During the spin approximately three quarters of the vertical rudder of the tail unit is blanketed by the horizontal surfaces of the tail unit. The result is a belated recovery of control and frequently recovery is impossible.

The lateral control system of present-day airplanes consists essentially of the combination of ailerons together with the vertical fin of the tail unit, which latter with a portion of the airplane fuselage, constitutes keel surface to resist turning movement of the airplane, and it is an object of this invention to provide an airplane control which is entirely independent of the lateral control system and harmonizes with the other control surfaces of modern airplanes, to effectively and expeditiously recover from a spin and permit the horizontal, directional, and lateral controls to function in a normal manner.

A further object of the invention is to provide airplane controls operable to prevent involuntary movement of the airplane in a helical path and to permit operation of said controls either in conjunction with, or independently of the airplane directional control mechanism.

It is well known in the present state of the art to provide controls, stabilizers, elevators, fins, rudders and ailerons for heavier-than-air craft, but none of these are operable to prevent a spin or to expeditiously get the airplane out of a spin. It has been found from experiment that with the use of outboard drag rudders mounted at or in proximity to the wing tips on the under surface, after the teaching of the present invention, involuntary movement of the airplane in a helicoidal path can be immediately arrested, where the vertical rudders of the tail unit are used on modern aircraft and mounted in contemplation of the forces of control of present-day aircraft.

In modern airplane construction, it has been found that the mounting of outboard wing drag rudders in accordance with the teaching of the present invention, effectively stops involuntary helicoidal movement of the airplane.

Other objects of the invention will be apparent from the following description of the present preferred forms of the invention, taken in connection with the accompanying drawings, wherein Fig. 1 is a front perspective view of an airplane embodying a control constructed in accordance with the present invention;

Fig. 2 is a top plan view of the same;

Fig. 3 is a front elevational view thereof;

Fig. 4 is a perspective view of the control mechanism and controls per se, showing a portion of an airplane in dotted lines;

Fig. 5 is a detail fragmentary sectional view of the manner of mounting the control mechanism in the cockpit of the airplane, the latter being fragmentarily shown in dotted lines;

Fig. 6 is a detail fragmentary side elevational view, illustrating the manner of mounting one of the winged rudders;

Fig. 7 is a detail fragmentary, horizontal sectional view of one of the wings, illustrating the manner of mounting the rudder thereon;

Fig. 8 is a bottom perspective view of a modified form of airplane, illustrating the application of control rudders constructed in accordance with the present invention;

Fig. 9 is a detail, fragmentary sectional view of an airplane fuselage, showing a modified form of wing rudder control lever mounted in the cockpit; and Fig. 10 is a detail perspective view of one of the wing rudders.

It is of course, understood that the device of the present invention is applicable for use with any type of airplane, but in order to illustrate the application of the present invention, I have shown both a bi-plane and a monoplane. The bi-plane, as shown in Figs. 1, 2 and 3, embodies a fuselage 11, which may be of conventional design and is equipped with a pair of wings 12, which may also be of conventional design and engaged with the fuselage in a manner well-known in the art. The fuselage embodies a cockpit 13, which may be of standard construction and is formed to receive operating mechanism for the tail and wing rudders, in a manner hereinafter described. The fuselage is provided with a tail assembly generally designated 14, which embodies a vertical rudder 15, operated from the cockpit by rods or cables 16, in a manner well-known in the art.

The device of the present invention consists especially of wing rudders 17 which, in the present instance, are shown to be of airfoil section. Each of the rudders is fixedly secured to an operating arm 18, the ends of which are projected beyond the opposite terminals of the rudder. The upper end of each arm is bent at right angles and provided with a perforate eye 19, with which one end of an operating cable 20 is engaged. The opposite end of each arm provides a pintle 21, which is mounted for rotation in a band or collar 22, mounted on a wing strut 23. As shown to advantage in Fig. 6, the upper right angle end of each arm is housed within a wing 12 and is normally held in a neutral position by yielding means such as rubber bungee 25, which is suitably anchored in the wing. The wing rudders are mounted outboard, as shown to advantage in Fig. 1, in proximity to the wing tips, immediately below the lower surface of the upper wing, where the rudders are mounted on the biplane.

The rudder control cables 20 are trained downwardly over pulleys 26 or the like, through the bottom of the wing and into the fuselage where they are trained over rollers 27, mounted in the latter. The free end of each rudder control cable within the fuselage is engaged with a sleeve 28 slidably mounted on one of the tail rudder control rods 16. Each sleeve 28 is normally anchored on its rod 16, against the resistance of the cable 20, by a spring 29, one end of the latter being engaged with the spring and the opposite end secured to the fuselage.

The means employed for operating the tail rudder control rod 16 and the wing or drag rudder cables 20 comprises, in one embodiment of this invention, foot pedals 30 which are suspended, in a manner well-known in the art, on a suspension rod 31, mounted in the cockpit. Each of the pedals is engaged with one of the rods 16 as illustrated to advantage in Fig. 4. The pedals are normally held in a neutral or inoperative position by suitable means which, in the present instance, consists of rubber bungee 32, the opposite ends of which are anchored on the pedal and the intermediate portion thereof trained about pulleys 33. Pressure on either one of the pedals 30 operates the tail rudder 15 in the usual manner, unless sufficient pressure is exerted on the pedal to cause the rudder to be moved "hard over" at which time the wing or drag rudder 17 will automatically be brought into play, in a manner which will presently appear. In the normal operation of an airplane the tail rudder is moved in an arc of between five (5) and ten (10) degrees, and it is only under unusual conditions that it is necessary to urge the rudder laterally to a maximum extent until it is in the position known to aviators as "hard right" or "hard left". It is therefore the purport of the present invention to permit the tail rudder to be operated in the usual manner, but to automatically bring the wing or drag into play at the option of the pilot by simply exerting additional pressure on the foot lever. In order to attain this result, each of the rods 16 is equipped with an abutment collar 34, which is fixedly secured to its rod so as to move as a unit with the latter. The collars 34 are spaced from the sleeves 28 an appreciable distance, so that the tail rudder may be moved in each direction through an arc which permits normal operation of the rudder for directional control. As soon, however, as pressure is exerted on either of the foot pedals so as to urge the rudder to a degree beyond normal, say in excess of six (6) or eight (8) degrees, the abutment collar 34 will engage its adjacent sleeve 28, so as to slide the sleeve along the rod 16 and correspondingly exert pressure on the wing or drag rudder control cable 20. In this manner, one of the wing or drag rudders will be moved in the arc of a circle, to set up a resistance sufficient to take the plane out of a spin. It is, of course, manifest that only one of the pedals is operated at a time, so as to simultaneously operate the wing and tail rudders to dissipate the spin. The abutment collars 34 are adjustably mounted on the rods 16 to accelerate or retard the operation of the wing or drag rudders at the option of the pilot.

Where a monoplane is employed, supporting shafts or struts 35 are engaged with the lower face of the wing and depend therefrom. The shafts or struts are suitably braced to the wing and may be disposed vertically or at an inclination. Where interplane struts are employed, as shown in the form of invention illustrated in Figs. 1 to 7 inclusive, it is preferable to dispose the struts at an inclination, as illustrated to advantage in Fig. 3. The wing or drag rudders 17 are engaged with the shafts or struts 35 in the same manner that they are engaged with the interplane struts, where a biplane is used. Furthermore, the operation of the wing rudders on the monoplane is the same.

Should it be desired to equip the plane with wing or drag rudders operated entirely independently of the tail rudder control mechanism, this may be accomplished by a separate hand lever mechanism, as illustrated to advantage in Fig. 9. When this form of invention is used, each of the drag or wing rudder control cables 21' may be engaged with one end of a lever 30', the latter being provided with a handle 36 in convenient accessibility to the pilot. The lever is pivotally mounted in the cockpit as indicated at 37, so that pressure on the handle end of the lever away from the pilot correspondingly exerts pressure on the cable 21 to operate the drag or wing rudder.

Although I have herein described the preferred forms of my invention, I am aware that various changes may be made therein to carry out the principle of my invention. I deem it of the essence of importance in the present invention, however, to equip a plane with drag rudders or airfoils which are mounted outboard, preferably at the wing tips of the plane and independent of the normal directional control of the vertical rudder located at the stern of the airplane. Other changes may be made in my invention, within the scope of the appended claims.

What is claimed is:

1. In airplane control mechanism including operatively connected tail and wing rudders, said tail rudder being operable to a predetermined degree for directional control of the plane, and means carried by the tail rudder operating means whereby continued operation of said tail rudder effects movement of one of the wing rudders to stop helicoidal movement of the plane.

2. In airplane control mechanism, directional and spinning controls, means for operating said directional control, and secondary means in the path of said first means to operate the spinning control when the former moves to a predetermined extent.

3. An airplane control mechanism, in combination with tail and wing rudders, means common to said rudders for operating the tail rudder in either direction to a predetermined degree, and means co-acting with said first means to operate a wing rudder in conjunction with the tail rudder when said first means is operated beyond said predetermined degree.

CHARLES WALD.